US010433029B2

(12) United States Patent
Xu et al.

(10) Patent No.: US 10,433,029 B2
(45) Date of Patent: Oct. 1, 2019

(54) IMPLEMENTAL METHOD AND APPLICATION OF PERSONALIZED PRESENTATION OF ASSOCIATED MULTIMEDIA CONTENT

(71) Applicant: SHANGHAI JIAO TONG UNIVERSITY, Shanghai (CN)

(72) Inventors: Yiling Xu, Shanghai (CN); Wenjun Zhang, Shanghai (CN); Wenjie Zhu, Shanghai (CN); Lianghui Zhang, Shanghai (CN); Hao Chen, Shanghai (CN); Bo Li, Shanghai (CN); Jun Sun, Shanghai (CN); Ning Liu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 15/550,789

(22) PCT Filed: Feb. 2, 2016

(86) PCT No.: PCT/CN2016/073167
§ 371 (c)(1),
(2) Date: Aug. 13, 2017

(87) PCT Pub. No.: WO2016/127862
PCT Pub. Date: Aug. 18, 2016

(65) Prior Publication Data
US 2018/0041820 A1 Feb. 8, 2018

(30) Foreign Application Priority Data

Feb. 13, 2015 (CN) .......................... 2015 1 0080011
Feb. 13, 2015 (CN) .......................... 2015 1 0080580
(Continued)

(51) Int. Cl.
H04N 21/84 (2011.01)
H04N 21/8405 (2011.01)
(Continued)

(52) U.S. Cl.
CPC ... *H04N 21/8402* (2013.01); *H04N 21/23439* (2013.01); *H04N 21/8405* (2013.01);
(Continued)

(58) Field of Classification Search
CPC .......... H04N 21/8402; H04N 21/8549; H04N 21/8543; H04N 21/23439; H04N 21/8451; H04N 21/8405; H04N 21/8456
See application file for complete search history.

(56) References Cited

U.S. PATENT DOCUMENTS

2011/0231519 A1* 9/2011 Luby ................ H04N 21/23106
709/219
2012/0070129 A1* 3/2012 Lin ................ H04N 21/234327
386/278
(Continued)

Primary Examiner — Robert J Hance
Assistant Examiner — Aklil M Tesfaye

(57) ABSTRACT

An implementation method and an application of a personalized presentation of associated multimedia content are provided. The method includes steps of: by a multimedia content provider, uniformly completing full file content when producing a multimedia file, and classifying segments of the content through a marking method according to an importance and/or an association degree of the content, so as to produce different versions of the multimedia file; and selectively previewing and/or playing by a user according to the different versions. The present invention is a flexible and efficient method for scalable organization, storage and transmission in an Internet on-demand system, thereby adding a flexible organization mechanism for the media content that an existing multimedia protocol lacks, and solving problems
(Continued)

of an existing multimedia system, such as low transmission efficiency, waste of storage resources and poor user experience.

3 Claims, 5 Drawing Sheets

(30) Foreign Application Priority Data

| Jul. 9, 2015 | (CN) | .......................... 2015 1 0401550 |
| Dec. 17, 2015 | (CN) | .......................... 2015 1 0955611 |
| Jan. 18, 2016 | (CN) | .......................... 2016 1 0031034 |

(51) Int. Cl.
*H04N 21/845* (2011.01)
*H04N 21/2343* (2011.01)
*H04N 21/8543* (2011.01)
*H04N 21/8549* (2011.01)

(52) U.S. Cl.
CPC ..... *H04N 21/8451* (2013.01); *H04N 21/8456* (2013.01); *H04N 21/8543* (2013.01); *H04N 21/8549* (2013.01)

(56) References Cited

U.S. PATENT DOCUMENTS

2012/0272281 A1* 10/2012 Ha ................... H04N 21/23439
725/110
2013/0330056 A1* 12/2013 Abecassis ............ H04N 9/8715
386/241

* cited by examiner

First preferred embodiment

Second and fifth preferred embodiments

IMPLEMENTAL METHOD AND APPLICATION OF PERSONALIZED PRESENTATION OF ASSOCIATED MULTIMEDIA CONTENT

CROSS REFERENCE OF RELATED APPLICATION

This is a U.S. National Stage under 35 U.S.C 371 of the International Application PCT/CN2016/073167, filed Feb. 2, 2016, which claims priority under 35 U.S.C. 119(a-d) to CN 201510080011.X, filed Feb. 13, 2015, CN 201510080580.4, filed Feb. 13, 2015, CN 201510401550.9, filed Jul. 9, 2015, CN 201510955611.6, filed Dec. 17, 2015, and CN 201610031034.6, filed Jan. 18, 2016.

BACKGROUND OF THE PRESENT INVENTION

Field of Invention

The present invention relates to a method for new multimedia organization, storage and transmission in an Internet on-demand system, and more particularly to an implementation method and an application of a personalized presentation of associated multimedia content.

Description of Related Arts

With the rapid development of the multimedia technology, the multimedia content on the Internet has increased explosively, especially the extensive and in-depth high-definition and high-resolution video services; the pressure of the multimedia services on the network bandwidth is more prominent. At the same time, because of the different personalized interests of users and the time variance of the network situation, multimedia services nowadays are aggregated and the multimedia content is fragmented. Most of the existing multimedia protocols are merely concerned with the data integrity and security in the network transmission process. The quality of the multimedia services are ensured by ensuring the quality of service (QoS) of the network, but the integration of the multimedia content and the subjective satisfaction of the user are rarely considered.

At present, some multimedia protocols are basically achieved through the description of signaling information and the transmission and presentation of control data, without involving the level of the multimedia content organization, and considering a matching degree of the content organization with the storage and the transmission and the data optimization of the entire multimedia system. The result is that: although the multimedia producer have produced a complete program with uniform content, after editing and other post-production, the program issuer and provider segment the original program into different versions; each version is independent and becomes a separate media content. It seems that the program content is enriched; in fact, the ecological environment of the entire media system is destroyed, and a large number of duplicated data are generated. The duplicated data destroy the natural association system of the media content, which is not conducive to the management of the media content, increases the storage cost and causes the great waste of resources; moreover, the data units with the same data locally need to be transmitted repeatedly in the network, which greatly reduces the efficiency of data transmission. At the same time, the redundant independent existence of different versions of the program content makes the original rich media resources become bloated and messy, which increases the difficulty of the digital media content supervision; therefore, many pirated and infringing media contents easily access to the digital media market, causing the damage to the interests of program providers and consumers.

On the other hand, the richness of media resources also increases the burden on the consumption of the digital media of the users to some extent, and the users must spend more time in choosing the media consumption. Traditionally, the content provider provides rich media programs, such as various types of movie resources, but the programs are generally in the full version; the user can only demand a full version of the media program for consumption. In this case, if the users want to view the favorite programs, the users need to preview multiple programs; based on the low efficiency of the data buffer mechanism, the users need to wait for a long time, so that the user experience is very bad.

The better way is that the program issuer and the provider only logically segment the original program into different versions. Because of the wide application of fragmented units of the media content, the original program is still a unified natural whole physically. In the media content server, only the full version of the media needs to be stored, and meanwhile the corresponding signaling file is provided to describe the data units corresponding to different media versions. In this way, the users demand the relevant version of the media data according to own needs, and the server transmits only the corresponding data to the user according to the mapping between the media version and the data unit in the signaling information. For example, if the user just wants to preview a movie, the user only needs to demand preview version links, and the server only transmits the preview version of the movie data unit to the client for decoding and presenting; the user does not need to wait for the buffer of the entire movie content, so as to get the better user experience. The difficulty is that, it is difficult for the system to know the correspondence between the different versions of the media units, and the relevant signaling mechanism guidance is lacking; each media may have different versions with different duration; how to distinguish and manage these versions is an urgent problem to be solved.

In addition, although the current multimedia system can achieve the initial classification of the content, the users cannot get the corresponding description information of the multimedia content, and cannot achieve the independent choice. Even for the same program, the users have different selection demands. To implement the personalized presentation of the multimedia content and transmit the media resources in the media network more efficiently, a personalized presentation mechanism of the multimedia content is required. The server provides the user with the option of the associated multimedia content by transmitting the mapping table between the multimedia content and the media description to the user. The users can request different versions of the same content according to own requirements, or request the associated content of a media resource and other presentation forms, and then perform personalized settings according to the needs of the users.

The above personalized presentation mechanism of the multimedia content presents a new requirement. The associated media resources are represented by different edit lists, and different edit lists contain different media data units. For different multimedia contents, the users also have different selection perspectives. For example, for a party, the users can choose to view the multi-angle video or watch the performance of different singers. Therefore, the edit list can also be generated in a personalized manner according to the user requirements and program types. To implement the personalized transmission, a corresponding mechanism is required to transmit the description information of the multimedia content and the mapping relationship between the edit lists to the client that accepts the media resources.

SUMMARY OF THE PRESENT INVENTION

In view of above defects in the prior art, an object of the present invention is to provide an implementation method of a personalized presentation of associated multimedia content, which is a flexible and efficient method for scalable organization, storage and transmission in an Internet on-demand system, thereby adding a flexible organization mechanism for media content, which is lacking in existing multimedia protocols, and solving problems of existing multimedia systems, such as low transmission efficiency, waste of storage resources and poor user experience.

According to a first object of the present invention, an implementation method of a personalized presentation of associated multimedia content is provided, comprising steps of: by a multimedia content provider, uniformly completing full file content when producing a multimedia file, and classifying segments of the complete file content through a marking method according to an importance and/or an association degree of the content, so as to produce different versions of the multimedia file; and selectively previewing and/or play the different versions by a user.

Preferably, the method comprises following steps of:

Step 1, dividing the multimedia file into multiple versions through a version management of content classification;

Step 2, generating a differentiated MPD (Media Presentation Description) file corresponding to the versions; wherein according to the multiple versions of the multimedia file, the MPD file corresponding to the content classification, namely a version management tag of the content classification, is generated; and Step 3, according to own demands, requesting different versions of the multimedia file content by the user; transmitting the unified MPD file by a server; and, after parsing the MPD file, requesting corresponding media segment content from the server by a client according to an own network status, a device performance and a condition of the requested version.

Further preferably, the implementation method of the personalized presentation of the associated multimedia content comprises following steps of:

Step 1, dividing the multimedia file into the multiple versions through the version management of the content classification;

Step 2, corresponding to the multiple versions, generating merely one corresponding MPD file, wherein a @scaleID attribute, namely the version management tag of the content classification, is added to segment description of the MPD file; and Step 3, according to the own demands, requesting different versions of the multimedia file content by the user; transmitting the unified MPD file by the server; and, after parsing the MPD file, requesting the corresponding media segment content from the server by the client according to the own network status, the device performance and the condition of the requested version.

The existing multimedia protocol lacks the flexible management mechanism for the media content, which causes the low transmission efficiency, the waste of the storage resources and the poor user experience in the multimedia system. In view of the above problem, according to the implementation method of the personalized presentation of the associated multimedia content provided by the present invention, the optimized integration of the media content on the Internet can be achieved by adding the flexible organization, storage and transmission method of the media content. Logically, the same media resources are stored uniformly; the differential transmission is performed according to the media version requirements of the user; in addition, the specific media unit buffering and decoding presentation are performed at the client, which not only achieves the unified optimization of rich media resources, but also facilitates the supervision and control of the multimedia content; at the same time, the overall transmission efficiency of the multimedia data in the network is improved, the waste of storage space is reduced, and the better service experience is brought to the users.

According to a second object of the present invention, to solve the problems that the existing multimedia content classification cannot be refined, the transmission efficiency is low and the storage space is wasted, the present invention provides an implementation method of a multimedia content classification technology, wherein the important segments of the multimedia content are marked in the production of the multimedia files; all segments are divided into different levels according to the importance of the multimedia file content; when the user views the multimedia content, the multimedia content can be played selectively according to the different levels, instead of selecting blindly and randomly; a new MUR (Media Unit Relationship) information file is defined to describe the corresponding relationships between the multimedia file and different versions of content, mpu_seq_number, and level_list; mpu_seq_number is a mark field in MPU (Media Processing Unit); level_list is a set of mpu_seq_number, which has a one-to-one correspondence with different versions of the video.

Preferably, a multimedia content is cut into multiple MPU segments; after the content is classified into different versions, a corresponding relationship exists between different versions and mpu_seq_number; a new MUR information file is defined to describe the corresponding relationships between the multimedia file and different versions of content, mpu_seq_number and level_list; correspondence rules between a level_list array and different versions of the content are different and can be divided into two types, wherein: in Type 1, a one-to-one correspondence exists between the different versions of the content and the level_list; and in Type 2, the different versions of the content are combinations of the different level_list.

Differential transmission of the multimedia files is performed according to the contents of the MUR information file in the Type 1 and the Type 2.

The existing multimedia protocol has a technical blank in the multimedia content classification, which causes the low transmission efficiency and the waste of the storage resources. In view of the above problem, according to the implementation method of the multimedia content classification technology of the present invention, the associative classification of different versions of the media content can be achieved on the Internet by adding the scalable transmission, storage and presentation mechanism of the media content, thereby increasing the management control of the multimedia services, improving the transmission efficiency of the multimedia data and reducing the waste of the storage space. The method gives users the right to independently select the media version, which improves the user experience; moreover, the method can provide network operators with better multimedia content classification, transmission and storage solutions.

According to a third object of the present invention, the above-mentioned implementation method of the personalized presentation of the associated multimedia content is applied; a content-driven smart home control method is provided, wherein the video segments are marked based on the dominant hue of image and/or scene plot feature of a key frame in the video, or marked based on the audio data feature; corresponding tags are added; when the multimedia contents are played each time, the marked tags will drive the smart home equipment to work.

Preferably, the video segments are marked based on the image dominant hue of the key frame in the video, wherein the dominant hue of the key frame in the video MPU is extracted and marked; color_tag is defined by using the reserved field reserved in an MPUBox; and different color_tag can be used for different colors.

By using the above-mentioned content-driven smart home control method of the present invention, the smart home control system can be automatically driven by the multimedia content. Currently, most situations need a manual control of the smart system after a manual evaluation of the multimedia content; the cumbersome process of the manual control can be greatly simplified by the content-driven smart home control system of the present invention, and the present invention makes the control system more flexible.

According to a fourth object of the present invention, after the service provider marks the media content according to a category, or an importance and other information of the media content, the combination of the media data units with the same mark forms different edit lists. To provide services according to the personalized request of the user, the mark information of the media content needs to be described correspondingly, so that the user can understand the specific content of each edit list, thereby achieving the differential transmission and presentation, and providing an accurate service. To solve the problem that the user cannot select the associated multimedia content provided by the server, and achieve the personalized media presentation for different demands of the user, the present invention provides a description method of the personalized presentation information of the associated multimedia content, comprising following steps of: representing the associated multimedia contents of the media resources by different edit lists, wherein the media data units contained in different edit lists are in a supplementary relation or inclusion relation; in order to present the classification of the media resources and the corresponding relationship of the description information to the user, adding the description of the feature information or associated information of the media resources, thereby achieving the personalized presentation mechanism.

Further preferably, the description method of the personalized presentation information of the associated multimedia content comprises the following steps of:

defining an identifier of the media data unit contained in the same media resource or the corresponding description information, so as to generate descriptor signaling information including various multimedia content description information in the transmitted media resources;

parsing the descriptor signaling information by the client; by the user, selecting the multimedia content with the corresponding identifier or information representation according to the demand, and requesting the corresponding media data units to combine into a corresponding edit list; and by the server, parsing the user request and sending the user request to obtain the corresponding media data units; and parsing the information and implementing the personalized presentation by the client.

According to a fifth object of the present invention, in view of the incomplete presentation mechanism in the existing multimedia protocol, considering the presentation mechanism of the on-demand service based on user decision and the push mechanism of broadcast and real-time live broadcast services, as well as the presentation service of the associated content, the present invention provides a timeline control method for the personalized presentation of the multimedia content, comprising following steps of: in the process of presenting the multimedia resources, controlling the presentation time of the associated content by using the duration information of media data unit and the initial time of the presentation, so that different media resources or different associated versions of the same media resource have a corresponding presentation timeline.

Further preferably, the method specifically comprises following steps of:

S1, according to the media data unit contained in the associated content version of the media resource selected by the user, obtaining the corresponding duration information of each media data unit;

S2, determining a play-starting time according to the time when the user selects the media resource in a VoD (Video on Demand) service; by the service provider, determining the play-starting time in the broadcasting service, and identifying the play-starting time in the signaling information; and S3, obtaining an absolute presentation time of the corresponding media data unit according to the play-starting time in the step of S2 and an accumulation of duration of the media data unit in the corresponding associated content version, so that the corresponding presentation timeline is maintained to guide the presentation of the media content.

The timeline control method for the personalized presentation of the multimedia content of the present invention satisfies the personalized demands of the users, and ensures the smooth viewing experience of the users by using the relevance of the same program on the basis of saving the storage space. As the presentation timeline signaling of the media is transmitted flexibly with the signaling information, in view of the low user experience caused by the delay and packet loss in the process of consuming the media resources, if the packet loss event is detected before the presentation time, it is optional to wait the re-acquisition of media resources or repeatedly present the content of the previous media data unit, so as to prevent the playback from lagging and ensure the user experience. Instructions based on the presentation timeline are presented continuously; the detailed solution is not specified hereby.

By using the technical solution of the present invention, in view of the problem that the user cannot understand the media resources provided by the server due to the blank in information description of associated multimedia content in the existing multimedia protocol, the user can have a more intuitive and multifaceted understanding of the multimedia content by increasing the description of the multimedia content feature information or associated information; the personalized mapping relationship is described to provide associated media services, and ensure that the user can select the most suitable multimedia content as much as possible. The above solution is not limited to the description of the multimedia content provided by the server, but also applicable to the content description of the multimedia resources such as multiple sources or various classification methods, and can even be described by user-defined tags. The present invention solves the problem that the user cannot select the associated multimedia content provided by the server, and achieves the personalized media presentation for the different demands of the user.

BRIEF DESCRIPTION OF THE DRAWINGS

Other features, objects, and advantages of the present invention will become more apparent from reading the detailed description of non-limiting embodiments with below accompanying drawings.

DETAILED DESCRIPTION OF THE PREFERRED EMBODIMENT

Figure 1:
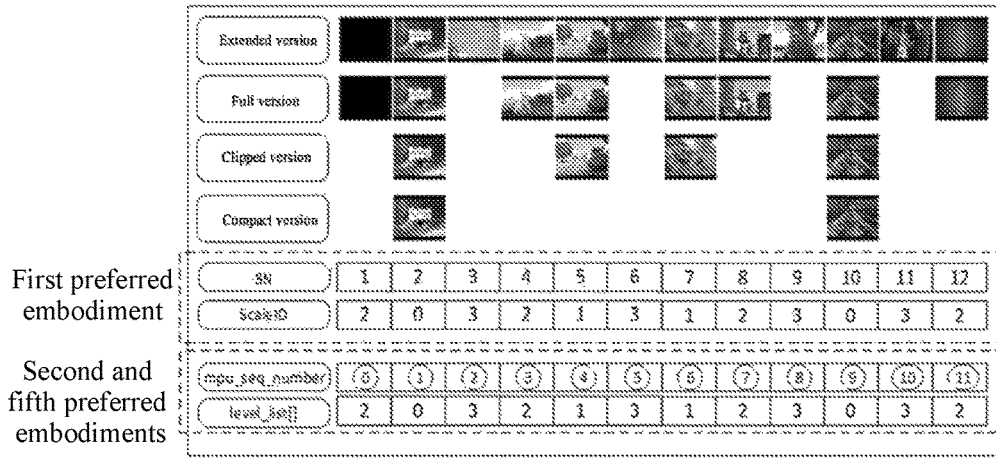
FIG. 1 is a schematic diagram of a mapping example between media versions and a media data unit according to first, second and fifth preferred embodiment of the present invention.

The present invention is described in detail as follows with reference to preferred embodiments. The following preferred embodiments will help those skilled in the art further understand the present invention, and not in any way limit the present invention. It shall be noted that several variants and improvements can be made without departing from a concept of the present invention by those skilled in the art. All of the above variants and improvement fall within a protection scope of the present invention.

First Preferred Embodiment

Nowadays, a capacity of video content is exploding, and an available time of people is more and more fragmented. When contacting a series of new videos, users often no longer directly demand the video and view full content of the video, but want to firstly preview the video, and then decide which video to view and whether to view the full content of the video according to own preferences and the available time at the moment.

The above problem can be effectively solved by the following method, so as to improve a user experience. When producing the video, a content provider uniformly completes the full content of the video, and classifies segments of the video through a marking method according to an importance and an association degree of the content, so as to produce different versions of the video. Of course, version information related to classification should be provided on a presentation interface, so as to facilitate selective content consumption of the users. When viewing the video, the users can selectively preview and play the video according to the different versions, instead of selecting blindly and randomly.

The video content is taken as an example. A content producer only needs to complete a full set of program content, and then an issuer divides the video into multiple versions through a version management of the content classification, and provides the multiple versions to a media service provider. A first version of the video is a preview version with duration of 5 minutes, and content of the first version only includes highlights of the video; a second version of the video is a clipped version with duration of 30 minutes, and content of the second version only includes a storyline and important scenes of the video; a third version of the video is a full version with duration of 120 minutes, and content of the third version includes a full story of the video; a fourth version is an extended version with duration of 150 minutes, and content of the fourth version includes extended content other than the full story, such as behind-the-scenes.

A mechanism of the version management of the content classification will be introduced by taking an MPEG-DASH (Dynamic Adaptive Streaming over HTTP) standard as an example. Of course, the mechanism is not limited to the DASH standard and can be applied to other standards and programs. DASH is called Dynamic Adaptive Streaming over HTTP and is established by an MPEG (Moving Picture Experts Group) of an international standardization organization, which is able to distribute media content through a HTTP protocol in an adaptive, progressive, download or streaming manner and support adaptive media consumption on terminals of different performance under different network conditions. DASH has a variety of fragmentation strategies in content organization, and has a corresponding signaling file for indicating fragmentation details. In view of generality, two modes will be respectively described as follows.

Mode 1:

Generation of Differentiated MPD (Media Presentation Description) Files Related to Versions When generating a DASH segment, MPD files corresponding to the content classification can be generated according to the four versions of the above-mentioned video program. For the sake of simple and clear description, only a description situation of a segment list in MPD is written, and processing modes of other situations, such as a segment template, are in a similar way.

According to the segment list corresponding to the four versions of the above-mentioned video program, as shown in FIG. 1, when generating the segments, the MPD files of four matching content versions are automatically generated. A @scaleID attribute is added to an MPD element, which defines a level of the content classification described by the MPD file. A version correspondence table of the content classification is as showed in Table 1. In addition, the segment list in a SegmentList sub-element of a Representation element is no longer a simple full segment list, but a specific segment list corresponding to MPD@scaleID.

| Version | Preview version | Clipped version | Full version | Extended version |
| --- | --- | --- | --- | --- |
| scaleID | 0 | 1 | 2 | 3 |

Figure 2:
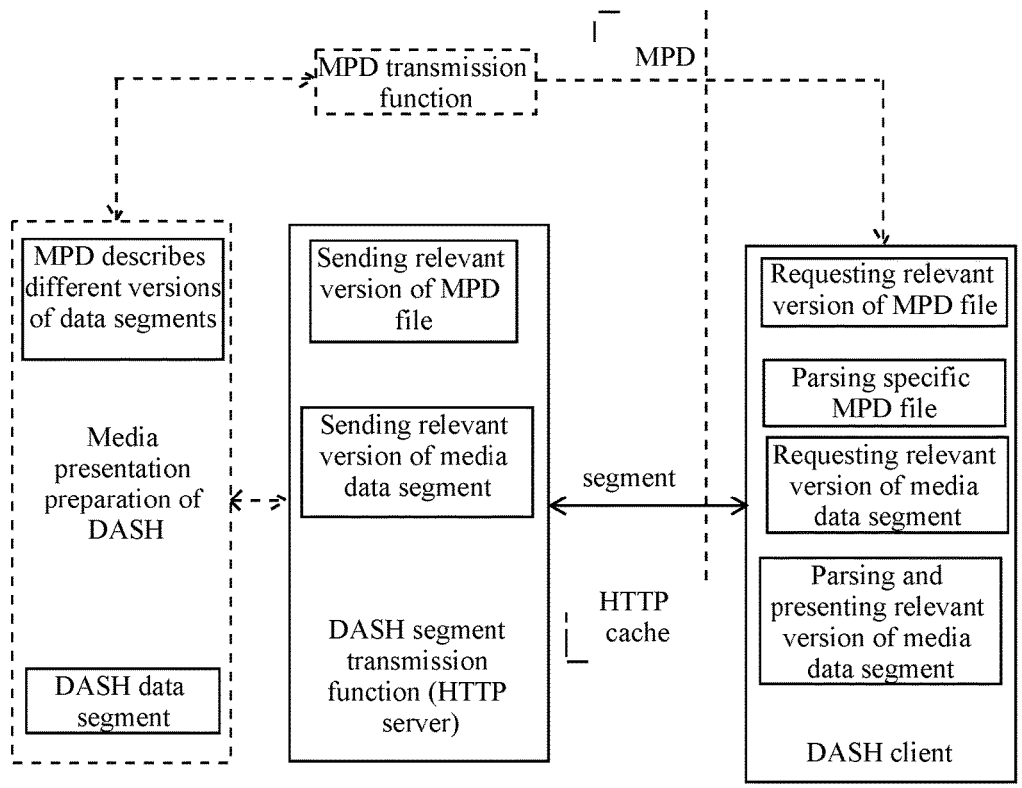
FIG. 2 is a schematic diagram of a classification mechanism of Mode 1 according to the first preferred embodiment of the present invention.

As shown in FIG. 2, a framework diagram of the entire classification mechanism is basically consistent with an original framework of DASH. During a media preparation phase, a generation mechanism of a media segment remains unchanged, and four MPD files corresponding to the different classification versions are generated. At a DASH client, the users request different versions of the video content according to own demands, then a server only needs to transmit the related MPD files, and after parsing the MPD files, the client requests content of the corresponding media segment to the server.

For example, when the user selects to play a preview version of a movie program, the server sends an MPD file with MPD@scaleID of 0; after parsing the MPD file, the client requests the segments listed in the SegmentList sub-element of the Representation element, namely channel1init.mp4, channel11.m4s, channel14.m4s, channel17.m4s and channel19.m4s. An example of the MPD file is shown as follows (a new parameter is scaleID, which can have different new applications).

in the MPD file provides the @scaleID attribute which marks the lowest version level of using the segment. The version correspondence table of the content classification is consistent with that of the Mode 1. If the @scaleID of a segment: channel13.m4s is 2, the segment will be transmitted by the server and consumed by the client only when the user requests the full version of the video.

Figure 3:
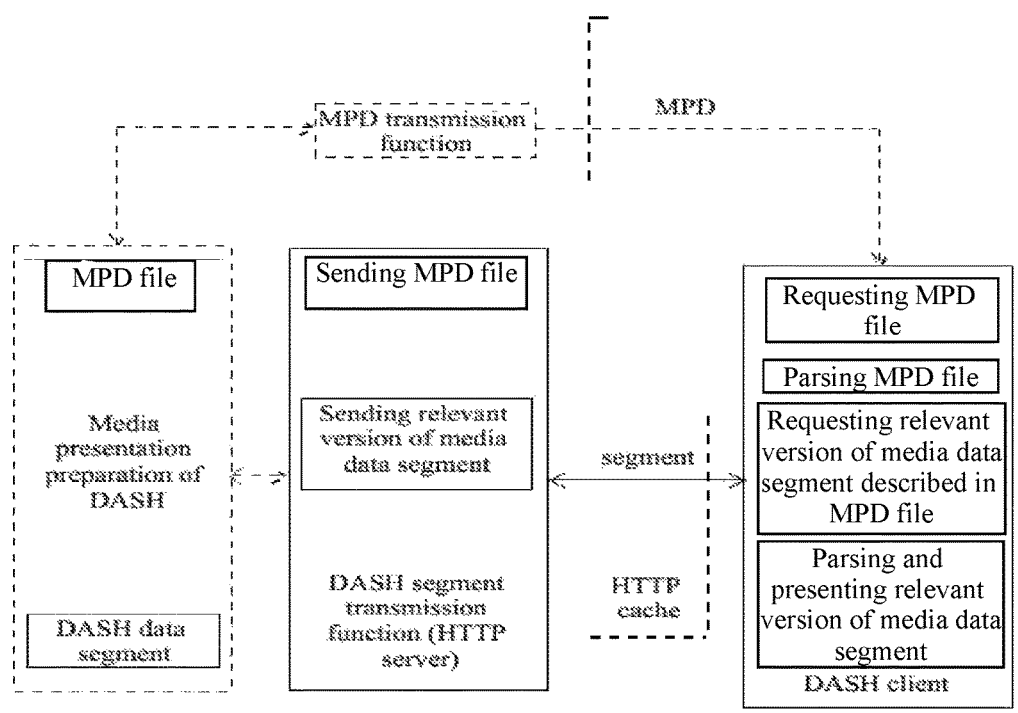
FIG. 3 is a schematic diagram of a classification mechanism system framework of Mode 2 according to the first preferred embodiment of the present invention.

As shown in FIG. 3, a system framework diagram of the entire classification mechanism is basically consistent with the original framework of DASH. During the media preparation phase, the generation mechanism of the media segment remains unchanged; and only one corresponding MPD file is generated, in which the @scaleID attribute, namely a version management tag of the content classification, is added. At the DASH client, the users request different versions of the video content according to the own demands; then the server transmits a unified MPD file; after parsing the MPD file, the client requests the corresponding media seg-

```
<?xml version="1.0"?>
<MPD
xmlns="urn:mpeg:dash:schema:mpd:2011"
minBufferTime="PT1.500000S"
type="static"
scaleID="0"
mediaPresentationDuration="PT0H26M26.92S"
profiles="urn:mpeg:dash:profile:full:2011">
<Period duration="PT0H26M26.92S">
<AdaptationSetsegmentAlignment="true"maxWidth="1920"maxHeight="1080"
maxFrameRate="30"par="16:9">
<ContentComponent id="1" contentType="video"/>
<ContentComponent id="2" contentType="audio"/>
<Representation id="1"mimeType="video/mp4"
codecs="avc1.640029,mp4a.6b" width="1920" height="1080" frameRate="30"
sar="1:1" audioSamplingRate="44100" startWithSAP="1" bandwidth="29437637"
sacleID="2">
<AudioChannelConfiguration
schemeIdUri="urn:mpeg:dash:23003:3:audio_channel_configuration:2011" value="2"/>
<SegmentList timescale="1000" duration="9754">
<Initialization sourceURL="channel1init.mp4"/>
<SegmentURL media="channel11.m4s"/>
<SegmentURL media="channel14.m4s"/>
<SegmentURL media="channel17.m4s"/>
<SegmentURL media="channel19.m4s"/>
</SegmentList>
</Representation>
</AdaptationSet>
</Period>
</MPD>
```

Mode 2:

By following an original DASH mechanism, only one MPD file is generated, wherein the @scaleID attribute of each segment is added to the Representation element When generating the DASH segment, the DASH segment can be distinguished according to the four content classification versions. Distinguishing instructions are presented in an MPD table generated simultaneously. For the sake of simple and clear description, only the description situation of the segment list in the MPD is written, and the processing modes of other situations such as the segment template are in the similar way.

According to the segment list corresponding to the four versions of the above-mentioned video program, as shown in FIG. 1, when generating the segments, each segment in the SegmentList sub-element of the Representation element ment content to the server according to an own network status, a device performance and conditions of the requested version.

For example, when the user selects to play the full version of the movie program, the server sends a unified MPD file; after parsing the MPD file, the client requests the media segments with the @scaleID attribute having a value of less than or equal to 2 listed in the SegmentList sub-element of the Representation element, namely channel1init.mp4, channel11.m4s, channel12.m4s, channel13.m4s, channel14.m4s, channel15.m4s, channel16.m4s, channel17.m4s, channel18.m4s, channel19.m4s and channel110.m4s; the above segments are sent by the server, then decoded by the client and presented to the user. An example of the MPD file is shown as follows.

```
<?xml version="1.0"?>
<MPD
xmlns="urn:mpeg:dash:schema:mpd:2011"
```

```
minBufferTime="PT1.500000S"
type="static"
mediaPresentationDuration="PT0H26M26.92S"
profiles="urn:mpeg:dash:profile:full:2011">
<Period duration="PT0H26M26.92S">
<AdaptationSetsegmentAlignment="true"maxWidth="1920"maxHeight="1080"
maxFrameRate="30"par="16:9">
<ContentComponent id="1" contentType="video"/>
<ContentComponent id="2" contentType="audio"/>
<Representation id="1"mimeType="video/mp4"
codecs="avc1.640029,mp4a.6b" width="1920" height="1080" frameRate="30"
sar="1:1" audioSamplingRate="44100" startWithSAP="1" bandwidth="29437637">
<AudioChannelConfiguration
schemeIdUri="urn:mpeg:dash:23003:3:audio_channel_configuration:2011"value="2"/>
<SegmentList timescale="1000" duration="9754">
<Initialization sourceURL="channel1init.mp4"/>
<SegmentURL media="channel11.m4s"scaleID="0"/>
<SegmentURL media="channel12.m4s"scaleID="1"/>
<SegmentURL media="channel13.m4s"scaleID="2"/>
<SegmentURL media="channel14.m4s"scaleID="0"/>
<SegmentURL media="channel15.m4s"scaleID="2"/>
<SegmentURL media="channel16.m4s"scaleID="1"/>
<SegmentURL media="channel17.m4s"scaleID="0"/>
<SegmentURL media="channel18.m4s"scaleID="1"/>
<SegmentURL media="channel19.m4s"scaleID="0"/>
<SegmentURL media="channel110.m4s"scaleID="1"/>
<SegmentURL media="channel111.m4s"scaleID="3"/>
<SegmentURL media="channel112.m4s"scaleID="3"/>
</SegmentList>
</Representation>
</AdaptationSet>
</Period>
</MPD>
```

The above-mentioned first preferred embodiment is a flexible and efficient method for scalable organization, storage and transmission in an Internet on-demand system, thereby adding a flexible organization mechanism for media content which is lacking in existing multimedia protocols, and solving problems of existing multimedia systems, such as low transmission efficiency, waste of storage resources and poor user experience.

Second Preferred Embodiment

When viewing a video, users often do not play the entire video directly; in most cases, the users may fast-forward or browse the video in a skipping manner, and then decide whether to play the entire video according to own preferences or acceptable duration of the video. When playing the video in the skipping manner, the users are highly likely to miss an important part of video content due to an inappropriate skipping time point selected randomly.

The above problem can be effectively solved by a following method, so as to improve a user experience. When producing the video, a content provider can mark important segments of the video content in some way, or even divide all the video segments into different levels according to an importance degree of the video content. When viewing the video, the users can selectively play the video according to the different levels, instead of selecting blindly and randomly.

For example, for a movie program, a producer can provide multiple different versions of the video. According to an organization structure of the video, the versions of the video can be divided into a compact version, a clipped version, a full version, an extended version and other video versions with different durations (see the first preferred embodiment).

A multimedia resource is assumed to be asset1 and cut into multiple MPU (Media Processing Unit) segments; a corresponding relationship between different versions after content classification and mpu_seq_number is as shown in FIG. 1, wherein the mpu_seq_number is a mark field in the MPU; as shown in FIG. 1, a video is assumed to be divided into MPU fragments with the mpu_seq_number of 0 to 11, and different mpu_seq_number sequences are combined into different versions of the video, for example, the compact version of the video is composed of the MPUs with the mpu_seq_number of 1 and 9.

To perform flexible differential transmission and presentation, a new MUR (Media Unit Relationship) information file is defined to describe corresponding relationships between media resources and different versions of the video, mpu_seq_number, level_list, etc. Correspondence rules between a level_list array and different versions of the video are different and can be divided into two types. In Type 1, a one-to-one correspondence exists between the different versions of the video and the level_list; and in Type 2, the different versions of the video are combinations of the different level_list.

Based on the above description, content of the MUR information file in the Type 1 and the Type 2, how to perform the differential transmission and how to flexibly present the different versions of the video by using a mediaSrc attribute in a CI (Composition Information) file at a client will be described separately as follows.

Type 1:

The level_list is composed of different MPUs, and has a one-to-one correspondence with the different versions of the video; and a correspondence rule thereof is as shown in the table below.

Type 1 One-to-one correspondence between the different versions of the video and the level_list

| level_list[ ] | 0 | 1 | 2 | 3 |
|---|---|---|---|---|
| mpu_seq_number set | 1, 9 | 1, 4, 6, 9 | 0, 1, 3, 4, 6, 7, 9, 11 | 0, 1, 2, 3, 4, 5, 6, 7, 8, 9, 10, 11 |

| Type 1 One-to-one correspondence between the different versions of the video and the level_list | | | | |
|---|---|---|---|---|
| level_list[ ] | 0 | 1 | 2 | 3 |
| Video version | Compact version | Clipped version | Full version | Extended version |

The correspondence rule is completely matched with FIG. 1, but FIG. 1 is only an example. For different examples, the correspondence rule can also be changed. The same is true for the Type 2.

To improve transmission efficiency, when the user needs more video segments, a server only needs to transmit the missing MPU of the user. For example, if the user wants to continue viewing a corresponding video of level_list[j] after on-demand viewing a corresponding video of level_list[i], wherein $0 \le i < j \le 3$, because the user has already locally stored all MPUs contained in the level_list [i], the server only needs to continue pushing the MPUs contained in $\Delta_{i,j}$=level_list[j]-level_list[i].

At the client, the user reforms the level_list [j] according to the local level_list [i] and the received $\Delta_{i,j}$. Values of the mediaSrc attributes in the CI file for the different versions of the video are as shown in the table below.

| Type 1 One-to-one correspondence between the different versions of the video and the level_list | |
|---|---|
| Different versions of the video | mediaSrc attribute value in the CI file |
| Compact version | mediaSrc="mmt://asset1?level_list=level_list[0]" |
| Clipped version | mediaSrc="mmt://asset1?level_list=level_list[1]" |
| Full version | mediaSrc="mmt://asset1?level_list=level_list[2]" |
| Extended version | mediaSrc="mmt://asset1?level_list=level_list[3]" |

Type 2:

Unlike the Type 1, the level_list is composed of different MPUs, and no overlapping MPU exists between each level_list[]. Different versions of the video are composed of different level_list, and the correspondence rule thereof is as shown in the table below.

| Type 2 Different versions of the video are the combinations of level_list | | | | |
|---|---|---|---|---|
| level_list[ ] | 0 | 1 | 2 | 3 |
| mpu_seq_number set | 1, 9 | 4, 6 | 0, 3, 7, 11 | 2, 5, 8, 10 |
| Video version | Compact version | Clipped version - Compact version | Full version - Clipped version | Extended version - Full version |

As seen from the above table, the compact version of the video is composed of level_list[0]; the clipped version of the video is composed of level_list[0] and level_list[1], and level_list[2] is a difference between the full version of the video and the clipped version of the video; the extended version is composed of four level_list. When the users want to view the full version of the video after viewing the clipped version of the video, the users only need to perform the differential transmission of the MPU fragments contained in level_list[2]. In the Type 2, the values of the mediaSrc attributes in the CI file for the different versions of the video are as shown in the table below.

| Type 2 Different versions of the video are the combinations of level_list | |
|---|---|
| Different versions of the video | mediaSrc attribute value in the CI file |
| Compact version | mediaSrc="mmt://asset1?level_list=level_list[0]" |
| Clipped version | mediaSrc="mmt://asset1?level_list=level_list[0-1]" |
| Full version | mediaSrc="mmt://asset1?level_list=level_list[0-2]" |
| Extended version | mediaSrc="mmt://asset1?level_list=level_list[0-3]" |

The MUR information file contains important information of the content classification, as described above. The important information can be transmitted through different methods, such as through defining a new signaling unit, a signaling file, a signaling message, or a descriptor, or through adding header information of a transmission packet. The information described by MUR can be transmitted and used through different modes according to different implementation methods. In view of the transmission mode of the MUR information file, four modes are put forward as examples; the method for adding the MUR information to signaling information includes but not limited to the following modes.

Mode 1 Adding the MUR Information to the Existing CI File

A function of the CI file is to guide a presentation of the media resource, and level_list is also the related information for parsing the resource, so that content of the level_list can be added to the existing CI file. When parsing the CI file, a receiver needs to support parsing of the level_list information.

Mode 2 Adding an MUR File that Describes the MUR Information to the Signaling Information In the same way as in the Mode 1, a file that describes the MUR information and is similar to the CI file can also be defined. The advantage of the Mode 2 is that the CI file in the existing protocol is not required to be changed. The generated MUR file can be transmitted in parallel with the CI and HTML (Hypertext Markup Language) files. According to a transmission way of the CI file in the protocol, an appropriate way to transmit the MUR file is to arrange the MUR file in an MPI (Message Passing Interface) table and then transmit as a part of the signaling message.

| Syntax | Value | No. of bits | Mnemonic |
|---|---|---|---|
| MPI_table ( ) { | | | |
|     table_id | | 8 | uimsbf |
|     version | | 8 | uimsbf |
|     length | N1 | 16 | uimsbf |
|     reserved | '1111' | 4 | bslbf |

-continued

| Syntax | Value | No. of bits | Mnemonic |
|---|---|---|---|
|     PI_mode | | 2 | uimsbf |
|     reserved | '11' | 2 | bslbf |
|     MPIT_descriptors { | | | |
|         MPIT_descriptors_length | N2 | 16 | uimsbf |
|         for (i=0; i<N2; i++) { | | | |
|             MPIT_descriptors_byte | | 8 | uimsbf |
|         } | | | |
|     } | | | |
|     PI_content_count | N3 | 8 | uimsbf |
|     for (i =0; i<N3; i++) { | | | |
|         PI_content_type { | | | |
|             PI_content_type_length | N4 | 8 | uimsbf |
|             for (j=0; j<N4; j++) { | | | |
|                 PI_content_type_length_byte | | 8 | uimsbf |
|             } | | | |
|         } | | | |
|         PI_content_name_length | N5 | 8 | uimsbf |
|         for (j=0; j<N5; j++) { | | | |
|             PI_content_name_byte | | 8 | uimsbf |
|         } | | | |
|         PI_content_descriptors { | | | |
|             PI_content_descriptors_length | N6 | 16 | uimsbf |
|             for (i=0; i<N6; i++) { | | | |
|                 PI_contnent_descriptors_byte | | 8 | uimsbf |
|             } | | | |
|         } | | | |
|         PI content length | N7 | 16 | uimsbf |
|         for (j=0; j<N7; j++){ | | | |
|             PI_content_byte | | 8 | uimsbf |
|         } | | | |
|     } | | | |
| } | | | |

The MUR file is added to the MPI table; a part needing to be changed is within a description part of PI_content; a value of the PI_content count is increased by 1; the PI_content_type field describes a type of the MUR file; a file format suitable for describing the MUR information can be selected according to the actual situation; a value of the PI_content_type_length is a length of the file type; a value of the PI_content_type_length_byte is the type of the MUR file; a value of the PI_content_name_length is a length of a name of the MUR file; a value of the PI_content_name_byte is a value of the name of the MUR file; the PI_content_descriptores_length and the PI_content_descriptors_byte are a length and content of description information of the MUR file respectively, and currently can be null for later expansion; the PI_content_length and the PI_content_byte are a length and content of the MUR file respectively.

After the MUR file is written to the MPI table as described above, the MUR information can be transmitted.

Mode 3 Adding a Descriptor that Describes the MUR Information

Some descriptive descriptors are defined in the signaling message defined by the existing MMT (MPEG Media Transport) protocol; the descriptor, such as dependency descriptor and MPU_timestamp_descriptor, is descriptive information for defining some fields or functions in a signaling part of MMT. Therefore, a descriptor that describes the MUR information can be defined, which describes level information of the MPU in the descriptor. A field of asset_descriptors exists in the MPI table; the relevant descriptor can be added to the asset_descriptors as required. When the level information of the MPU needs to be described in the signaling, it can be realized by adding the descriptor to the asset_descriptors.

Mode 4 Adding a Signaling Table that Describes the MUR Information

According to the above ideas, in addition to several existing signaling tables, a table for specifically describing the MUR information can be added to the signaling information. After generating the table that describes the MUR information, a specific header is added to generate a message for describing the MUR information; the message and a PA message, an MPI message, an MP message, a CRI message and the like compose new signaling information for being transmitted. After receiving the signaling message, the receiver parses the signaling message to obtain the relevant level_list information.

Figure 4:
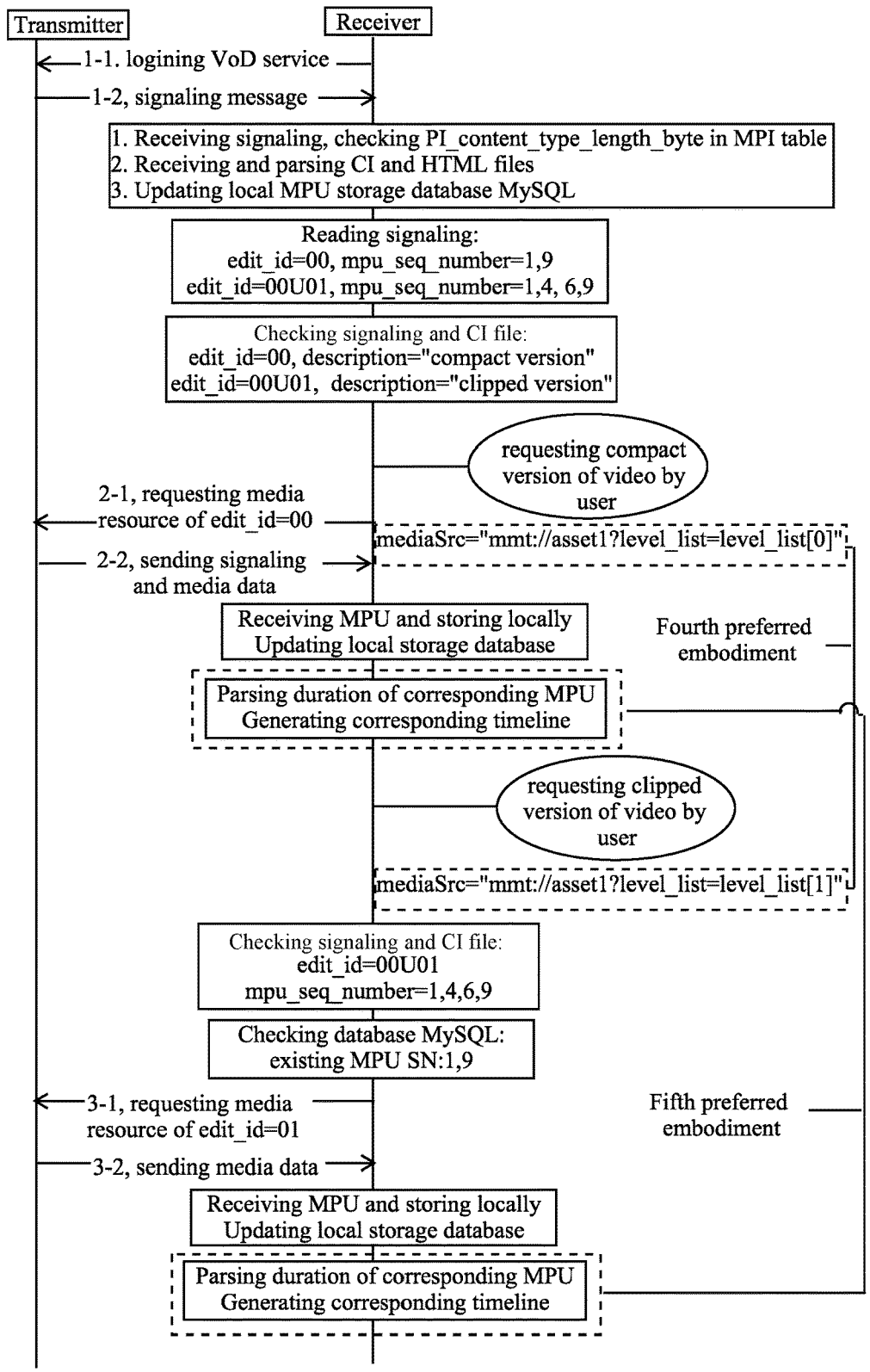
FIG. 4 is a flow chart of an implementation method of a personalized presentation of associated multimedia content according to second, fourth and fifth preferred embodiments of the present invention.

In order to more clearly describe the implementation method of the present invention, FIG. 4 shows a process of constructing the MUR file according to the above-mentioned method of Type 1, and transmitting the MUR file by using the above-mentioned Mode 2; a specific implementation process is described by way of example. It can be seen from FIG. 4 that when the receiver logs in a VoD (Video on Demand) service, a transmitter sends the signaling information; the receiver receives the MUR, CI and HTML files by judging the PI_content_type_length_byte field in the MPI table, and updates and generates an MPU storage database MySQL maintained locally; when the user requests the compact version of the video, the receiver finds the compact version corresponding to level_list [0] by checking the MUR file, and finds the corresponding mpu_seq_number of 1,9; at the moment, the client requests the MPUs, stores locally and plays to the user, and updates the local database. When the user continues requesting the clipped version of the video, the user can acquire MPUs not stored locally from the transmitter by checking the MUR file and the local database; the MPUs are obtained through level_list[1]-level_list[0], wherein the mpu_seq_number of the MPUs is 4,6. After the receiver receives the MPUs having the mpu_seq_number of 4,6, the MPUs are recombined with the locally-stored MPUs having the mpu_seq_number of 1,9 to form the clipped version of the video.

The above-mentioned second preferred embodiment illustrates the proposed solutions by taking the MMT as an example; but the solutions can also be used for other file encapsulation, transmission systems and protocols.

Third Preferred Embodiment

Based on an application of the above-mentioned first and second preferred embodiments, the third preferred embodiment of the present invention provides a content-driven smart home control method.

At present, smart home equipment gradually appears in each family. By taking a product produced by Philips known as the most intelligent LED bulb in the world, Philips hue, as an example, a method for marking video and audio data to drive a hue system is given.

1. Introduction to Philips Hue

Philips hue looks like an ordinary light bulb, but can be connected to a home router in a bridging mode, thereby allowing users to make more personalized control of lighting. Philips hue applies an LED lighting technology and a wireless interconnection technology; on a basis of providing LED lighting, Philips hue creates a convenient life for people by light in more ways that Philips hue can automatically turn on/off the light, or change a light color through a mobile phone positioning function when people go home or go out. By setting a timing reminder function, Philips hue can make a daily life more regular. For example, Philips hue can gradually brighten up a house, and the light will remind people to fall asleep. Philips hue can provide different shades of white tones, lights from warm colors to cool colors, and more than 16 million kinds of pre-programmed color options (red-green-blue combination), as well as four different preset modes, such as a relaxation mode, a reading mode, a concentration mode and an activity mode. Philips hue can help the user create a specific lighting scene for a specific atmosphere, remotely control and monitor the lights at home, set a timer to manage daily lighting requirements, and help the user fall asleep and wake up the family. In addition, the user can even use a photo in a device as a palette for color selection, and set a program to activate a specific color at a specific time of day.

The function of Philips hue can be constantly enriched; a network platform opens API (Application Programming Interface) and SDK (Software Development Kit) to developers; new application solutions have been generated continuously; the users can share personalized lighting formulas through the platform; more than 40 new applications have been developed. The above programs allow Philips hue to associate with more devices and applications, wherein some programs can show a heartbeat with a change of light; some programs can control the light through sound; and some programs can synchronize with a change of TV screen.

Figure 5:
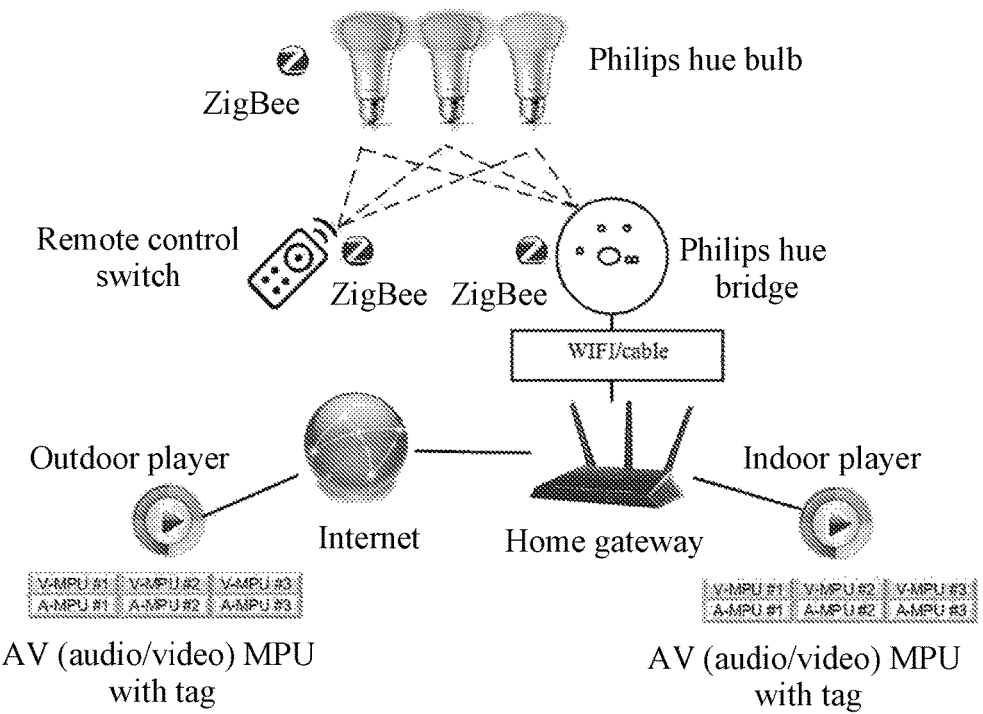
FIG. 5 is a sketch diagram of controlling a hue through MPU (Media Processing Unit) according to the third preferred embodiment of the present invention.

The third preferred embodiment automatically drives the smart home control system, such as the above-mentioned Philips hue, through multimedia content. Corresponding tags are added to the used multimedia content; when the multimedia content is played, the tags will drive the smart device to work. Specified descriptions are illustrated as follows, as shown in FIG. 5.

2. Mark Media Data Fragments

In MMT of a heterogeneous network environment transport protocol, all media data is encapsulated in a fragmented MPU format; duration of each MPU is about 0.5 seconds; the video and the audio of multimedia audio and video data are encapsulated separately. Based on the above media data encapsulation format, the MPU can be marked according to following methods.

(a) Mark the Video MPU According to a Dominant Hue of a Key Frame

In the Philips hue system, the color change of a bulb is controlled by a color of picture, so that the dominant hue of the key frame in the video MPU can be extracted and marked; color_tag is defined by using a 7 bit field reserved in MPUBox; different color_tag can be used for different colors, as shown in the table below.

| MMT definition | After modification |
| --- | --- |
| aligned(8) class MPUBox extends FullBox('mmpu', version, 0){ unsigned int(1) is_complete; unsigned int(7) reserved; unsigned int(32) mpu_sequence_number; | aligned(8) class MPUBox extends FullBox('mmpu', version, 0){ unsigned int(1) is_complete; unsigned int(7) color_tag; unsigned int(32) mpu_sequence_number; |

A value of color_tag can be assigned by analyzing the key dominant hue in the video MPU; required new attributes should be added in the MPUBox. Alternatively, the value of color_tag can be assigned by extracting the dominant hue of the MPU through an algorithm. In some embodiments of the present invention, the reserved 7 bit field is used for color_tag; if more bits are required in the future, the bit number can be expanded.

(b) Mark the Video MPU According to a Scene Plot

In the Philips hue system, different lighting modes can be presented according to different ambiences in life. Therefore, according to the third preferred embodiment, a mode of a scene in the video can be extracted and then judged, for example, judging whether the mode belongs to a romantic or intense mode, so as to mark the MPU. Following an example of the above table, the reserved field in the MPUBox can be defined as scene_tag, and different algorithms can be used to extract the modes in the scene.

| MMT definition | After modification |
| --- | --- |
| aligned(8) class MPUBox extends FullBox('mmpu', version, 0){ unsigned int(1) is_complete; unsigned int(7) reserved; unsigned int(32) mpu_sequence_number; | aligned(8) class MPUBox extends FullBox('mmpu', version, 0){ unsigned int(1) is_complete; unsigned int(7) color_tag; unsigned int(8) scene_tag; unsigned int(32) mpu_sequence_number; |

(c) Mark the Video MPU According to a Tone

In the Philips hue system, the light mode can be controlled by the tone of music; therefore, in some embodiments of the present invention, a tone feature in the audio MPU can be extracted, and then the MPU is marked. Following an example of the above table, the reserved field in the MPUBox can be defined as tone_tag, and a variety of different algorithms can be used to extract the tone of audio data.

Since the corresponding scene_tag and tone_tag are loaded in the media content, during normal playback of the media content, after reading the corresponding new attribute, the device will transmit information of the attribute to an interface of a lighting control device. At the moment, the lighting device will parse instructions and parameters of the lighting control system based on the received attribute information. Thus, the lighting can be adjusted in real time with the playback of the media content.

According to the third preferred embodiment, the MPU-Box is taken as an example and how to add new attributes is explained, so as to achieve a combination of media content and lighting. However, in practical applications, new attributes can be added to other signaling locations according to actual needs. In the above-mentioned third preferred embodiment of the present invention, the lighting is taken as an example to illustrate how to combine the traditional multimedia with the smart home. The ideas and methods applied in the present invention can also be extended and applied to other smart homes or even a smart city system.

Fourth Preferred Embodiment

When viewing multimedia content, users are often not interested in content of an entire program; the users may only be interested in a character or scene in the program. An intelligent media transmission system can classify multimedia content from different perspectives, namely mark the content with different identifiers, so as to provide possibility for personalized demands of the users. Service providers establish a corresponding relationship between different multimedia content versions and different edit lists based on different tags, and a corresponding identifier thereof is edit id. To make the user identify the content corresponding to the edit list provided by the service, corresponding description information needs to be transmitted to ensure the personalized demands of the users.

Take a classified presentation of the same content as an example, a movie program is assumed to be asset1. A producer can provide multiple different versions of the video. According to an organization structure of the video, the versions of the video can be divided into a compact version, a clipped version, a full version, an extended version and other video versions with different durations.

A corresponding relationship between classification information and description information of the multimedia content is presented to the user, so that the user is convenient to select. In some embodiments of the present invention, the personalized presentation is implemented by adding the description information (feature information of the multimedia content or associated information of each version of a same media resource) to transmitted information and other ways; following three solutions are described as examples.

Solution I: A new description attribute is added to an existing CI element of MediaSync; the attribute is used to introduce the description information of different versions of the content, as shown below.

The CI information mainly contains a view element, an area element, a MediaSync element and an Option element. The view element provides time-domain control information for a layout of a visual area; the area element is a sub-element of the view element, namely a part of a visual view, corresponding to a div element in an HTML5 file that matches with the CI; the MediaSync element is used to indicate a media resource of the HTML5 file that matches with the CI; the Option element is used to indicate that a corresponding part of the CI is an option.

Each CI element can have different attributes; in the attributes involved in the above table, the id attribute is an identifier of the CI element; the style attribute is used to specify a CSS (Cascading Style Sheet) style of the element; the begin attribute indicates time at which the CI instruction begins to function; the end attribute specifies time at which the CI instruction ends to function; the refDiv attribute indicates an identifier of the div element in the HTML5 file corresponding to the element; the refId attribute indicates an identifier of one element in the HTML5 file corresponding to the element; the mediaSrc attribute indicates an address of the media resources; and a description attribute is added.

The function of the CI file is to guide the presentation of the media resource, and the edit list is related information for parsing the resource, so that the edit list content can be added to the existing CI file. When parsing the CI file, a receiver needs to support parsing of the edit list information. The MediaSync element in the CI file is used to specify the media resource, so that the description information can be added to the media resource when the media resource is specified. Therefore, the description attribute is added to the MediaSync element to describe the content description information corresponding to the media resource.

The media resources in the above-mentioned program include a video and an audio, respectively asset1 and asset2. A server identifies an identifier of a media data unit in the asset and classifies into different edit lists. Each edit list is identified by the corresponding edit id, and the corresponding CI file is generated, including the transmitted edit list and the corresponding media description information (description). The client parses the received CI file, selects the corresponding description according to demands of the users, parses the edit id information and requests the corresponding media data unit.

Solution II: A new element EditDesp for description is added to the CI file.

```
<mmtci:CI>
    <mmtci:view id="View1" style="position:absolute; width:1920px;
height:1080px" mmtci:begin="0s" mmtci:end="indefinite">
        <mmtci:area id="divL1" style="position:absolute; left:0px; top:0px;
width:1920px; height:1080px" mmtci:begin="0s" mmtci:end="indefinite"
mmtci:refDiv="Area1"/>
    </mmtci:view>
    <mmtci:MediaSync refId="Video1" >
        <mmtci:Option mmtci:mediaSrc="Package1/asset1?edit_id=00 ∪ 01 ∪ 10"
description="full version"/>
        <mmtci:Option mmtci:mediaSrc="Package1/asset1?edit_id=00"
description="compact version"/>
    <mmtci:MediaSync>
    <mmtci:MediaSync refId="Audio1" />
        <mmtci:Option mmtci:mediaSrc="Package1/asset2?edit_id=00 ∪ 01 ∪ 10"
description="full version"/>
        <mmtci:Option mmtci:mediaSrc="Package1/asset2?edit_id=00"
description="compact version"/>
    </mmtci:MediaSync>
<mmtci:CI>
```

```
<mmtci:CI>
    <mmtci:view id="View1" style="position:absolute; width:1920px; height:1080px"
mmtci:begin="0s" mmtci:end="indefinite">
        <mmtci:area id="divL1" style="position:absolute; left:0px; top:0px;
width:1920px; height:1080px" mmtci:begin="0s" mmtci:end="indefinite"
mmtci:refDiv="Area1"/>
    </mmtci:view>
    <mmtci:MediaSync refId="Video1" >
        <mmtci:Option mmtci:mediaSrc="Package1/asset1?edit_id=00 U 01 U 10"
/>
        <mmtci:Option mmtci:mediaSrc="Package1/asset1?edit_id=00" />
    </mmtci:MediaSync>
    <mmtci:MediaSync refId="Audio1" />
        <mmtci:Option mmtci:mediaSrc="Package1/asset2?edit_id=00 U 01 U 10"
/>
        <mmtci:Option mmtci:mediaSrc="Package1/asset2?edit_id=00" />
    </mmtci:MediaSync>
    <mmtci: EditDesp>
        <mmtci:edit edit_id=00 description="trailer version"/>
        <mmtci:edit edit_id=00U01 description="compact version"/>
        <mmtci:edit edit_id=00U01U10 description="full version"/>
        <mmtci:edit edit_id=00U01U10U11 description="extend version"/>
    </mmtci:EditDesp>
</mmtci:CI>
```

The media resource information is placed in the MediaSync; a new element EditDesp with the same level as the MediaSync is added to the CI, and used to indicate the description information of all associated contents in the media resources; the edit element is a sub-element of the EditDesp element; each edit element represents personalized presentation description information of one class. The edit_id attribute and the description attribute are added to the edit element; the edit_id attribute is used to identify a certain level or part of media resources; the description attribute is used to describe the content description information of the media resources.

The description of the four associated contents in the media resource is defined in the EditDesp element in the above-mentioned program, and written to the corresponding edit_id. The client parses the received CI file, selects the corresponding description according to the demands of the users, parses the edit id information and requests the corresponding media data unit. The CI file generated for the same media resource at the client is consistent and complete, which satisfies the personalized demands of the users, and reduces the server to repeatedly generate the relevant description and the corresponding edit id.

Solution III: A descriptor description is added to signaling

| Synax | Value | No. of bits | Mnemonic |
|---|---|---|---|
| Edit_descriptor( ) { | | | |
|    descriptor_tag | | 16 | uimsbf |
|    descriptor_length | | 32 | uimsbf |
|    edit_list_number | N1 | 8 | uimsbf |
|    for(i=0; i<N1; i++) { | | | |
|      edit_id | | 8 | uimsbf |
|      edit_description_length | N2 | 8 | uimsbf |
|      for(j=0; j<N2; j++) { | | | |
|        edit_description_byte | | 8 | |
|      } | | | |
|    } | | | |
| } | | | |

Meanings of the corresponding elements contained in the above table are described as follows.

The descriptor_tag defines a tag of a descriptor type.

The descriptor_length defines a length of the descriptor.

The edit_list_number defines the associated content of the media resource, and N1 represents the number of the associated contents.

The edit_id defines a label of each version of the associated content of the media resource.

The edit_description_length is a length of level description information of the media resource, in bytes.

The edit_description_byte specifically describes one byte in the message.

The server identifies the identifier of the media data unit in the media resource and classifies into different edit lists. Each edit list is identified by the corresponding edit id. To achieve an interaction between the user and the system, the transmitted media resources are identified and the relevant content for presentation is selected according to the demand, then the system generates the descriptor signaling which contains the transmitted edit list and the corresponding media description information (description) therein. The client parses the received signaling information, selects the corresponding description according to the demands of the users, parses the edit id information and requests the corresponding media data unit. When the description information related to the content is needed, it can be achieved by adding the descriptor to the asset_descriptors.

In summary, the first and second preferred embodiments are different implementation methods of the personalized presentation in the DASH and MMT transmission protocols; the media content is classified into different levels (namely the edit list in the fourth preferred embodiment). The third preferred embodiment is a specific application at different levels. Users do not distinguish the different edit lists; the users can only understand the corresponding description information of the edit lists, such as different video versions corresponding to the different edit lists, which is the difference between the fourth preferred embodiment and the above-mentioned preferred embodiments.

In order to more clearly describe the implementation method of the present invention, as shown in FIG. 4, the CI file is constructed according to the above-mentioned Solution II. A specific implementation process is described as follows by way of example. It can be seen from FIG. 4 that when the receiver logs in the VoD service, the transmitter sends the signaling information; the receiver receives the CI and HTML5 files by judging the PI_content_type_length_byte field in the MPI table, updates and generates an MPU storage database MySQL maintained locally, and parses the CI and HTML5 files; the classification information of the personalized presentation is provided for the users according to the control information in the CI and the new multimedia content description information (description); when the user requests the compact version of the video according to the classification information, the receiver finds the compact version corresponding to level_list [0] by the CI file, and finds the corresponding mpu_seq_number media data identifier of 1,9; at the moment, the client requests the corresponding MPUs, stores locally and plays to the user, and updates the local database. When the user continues requesting the clipped version of the video, the user can acquire MPUs not stored locally by checking the CI file and the local database; the MPUs are corresponding to level_list[1], wherein the mpu_seq_number media data identifier thereof is 4,6. After the receiver receives the MPUs having the mpu_seq_number media data identifier of 4,6, the MPUs are recombined with the locally-stored MPUs having the mpu_seq_number media data identifier of 1,9 to form the clipped version of the video.

Fifth Preferred Embodiment

On a premise of the first and second preferred embodiments, in view of an incomplete presentation mechanism in an existing multimedia protocol, the fifth preferred embodiment takes a full consideration of a presentation mechanism of an on-demand service based on a user decision and a push mechanism of broadcast and real-time live broadcast services, as well as a presentation service of associated content. For versions of the associated content of the same media resource, a presentation time of each media data unit is different; according to the version selected by a user and different operations during a playback process, duration of the media data unit is accumulated based on a starting time in signaling information by extracting the duration of the media data unit, so as to generate a presentation timeline of the corresponding version of media content; alternatively, an absolute presentation time of the media data unit is generated when signaling is generated, and then information of the corresponding presentation timeline is generated according to a selection of the users.

Specifically, a server provides the user with an option of associated multimedia content by transmitting a mapping table between the multimedia content and a media description to the user. The users can request different versions of the same content according to own requirements, or request the associated content of a media resource and other presentation forms. To save storage resources and achieve differentiated transmission, different versions of the same set of the media resources contain shared data units. However, the existing system cannot control the presentation time of different versions of the content, which may cause a vacant segment during media playback, thus affecting a user experience. Duration information of each data unit is provided by using the existing system with a consideration of characteristics of different transmission networks, for example, VoD determines the initial presentation time according to the time when the user selects the program; in comparison, broadcast and real-time live broadcast are presented on each device within a specified time, but problems of a random access and a real time capability in the real-time live broadcast are still required to be considered. Therefore, according to the fifth preferred embodiment, different personalized presentation timeline control mechanisms are introduced by taking the transmission network in three cases as an example.

Application I: VoD

In a VoD service, after the user selects a multimedia content, the server responds to the demand, reads the duration of the corresponding media data unit according to the version selected by the user, and generates corresponding guidance presentation information file and signaling information.

Take a classified presentation of the same content as an example, a movie program is assumed to be asset1, wherein the first version of the video is a compact version trailer with duration of 5 minutes, and includes only highlights in the movie; the second version of the video is a clipped version with duration of 30 minutes, and includes only a storyline and important scenes of the movie; the third version of the video is a full version with duration of 120 minutes, and includes a full story; the fourth version is an extended version with duration of 150 minutes, and includes the extended content other than the full story, such as behind-the-scenes, as shown in FIG. 1.

Application II: Broadcast Program

In the broadcast service, the server transmits a media data stream according to a predetermined program list. Considering the problem of the random access of the user, the server needs to perform carousel of information related to the presentation. The user can start viewing the media content at an access time based on the current received presentation timeline. At the same time, a viewing mode is switched in real time according to a status of a viewing device, such as a power level and other indicators, so as to provide a better user experience in the case of adapting to the device status.

Figure 6:
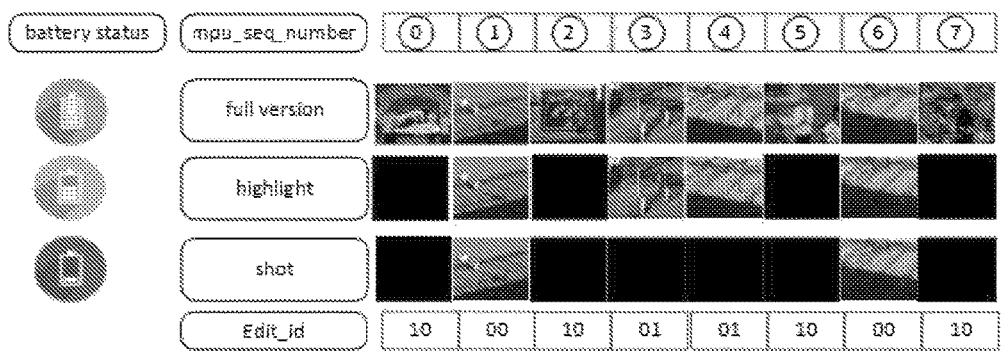
FIG. 6 is a schematic diagram of a differential presentation in a low battery status of a device according to the fifth preferred embodiment of the present invention.

Take a ball game program transmitted by a radio as an example: When the user watches the ball game on a mobile device, a remaining battery capacity of the mobile device should be considered. In the generation of the media data units, the media data units are classified according to an own importance. For example, splendid moments, goals and other shots are different associated contents of the program, and are endowed with different identifiers, as shown in FIG. 6. An electricity capacity of the user is roughly divided into levels of full battery, medium battery and low battery.

When the remaining battery capacity of the device reaches the corresponding level, a corresponding request is sent to the server; the server automatically switches the issued video media content and the complete audio content, and controls synchronization of the media content according to a transmission timeline. When part of the video media content is transmitted, the time information inside a video data unit cannot be parsed. Therefore, the time information is obtained by parsing the corresponding timeline-related signaling, so as to achieve the program presentation adapting to the device status.

Application III: Real-time Live Broadcast

In the real-time live broadcast service, the media data is directly transmitted to the client after being recorded, so that real-time requirements are very high. To ensure that personalized needs of the user can be achieved in the real-time live broadcast, the associated contents of the media resources need to quickly generate a separate timeline for control.

Figure 7:
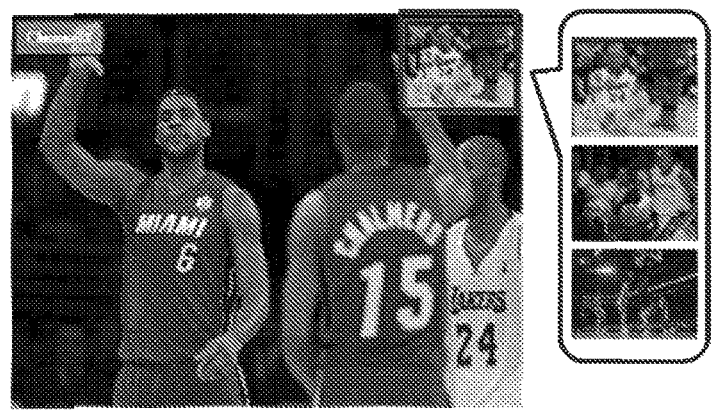
FIG. 7 is a schematic diagram of multi-view real-time live broadcast according to the fifth preferred embodiment of the present invention.

For example, when viewing the real-time live broadcast, most users also want to view the program content through multi-view services (as shown in FIG. 7). To save a network bandwidth and provide a stable real-time multi-view service, the contents provided by the service are transmitted to the user through a broadcast network, and the presentation timeline information of all associated contents of the media resources is transmitted. Since a total time of all associated contents and the presentation time of the included media data unit are different, multiple sets of different timelines need to be generated for presentation control.

In the present invention, the media resource is divided into independently decodable media units; the corresponding presentation timeline is automatically generated by using an association relation of the media unit according to the different video versions selected by the user. Therefore, the presentation mechanism of the present invention is more flexible than the prior art.

Some preferred embodiments of the present invention are described in detail as follows.

When viewing the media content, the users are often not interested in the entire program content; the users may only be interested in a character or scene in the program. The intelligent media transmission system can classify the multimedia content from different perspectives, namely mark the multimedia content with different tags, so as to provide the possibility for the personalized demands of the users. In the personalized presentation, different versions of the associated contents contain shared media data units, but the presentation time of the shared media data units in each version is different; therefore, the different presentation timelines need to be generated for each version to control the playback.

Figure 8:
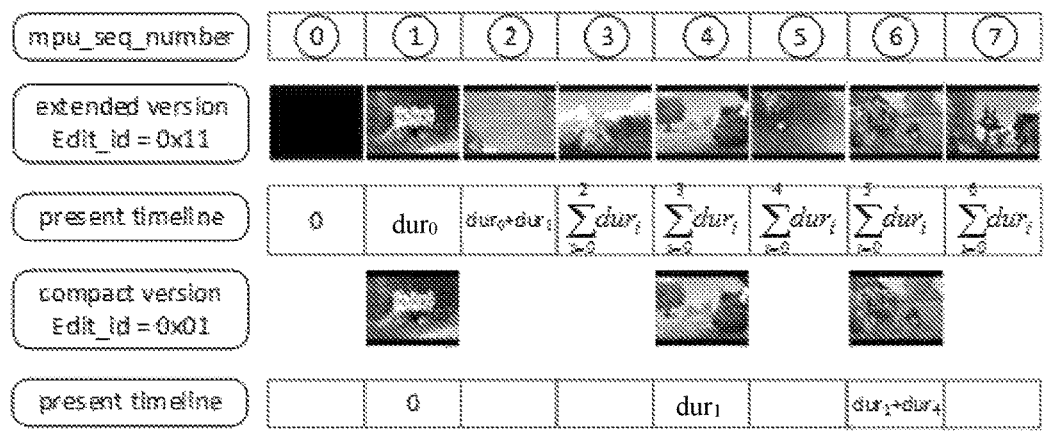
FIG. 8 is a schematic diagram of different versions of presentation timeline of associated content according to the fifth preferred embodiment of the present invention.

In the above example, the presentation time of the media data units of the MPU in each version is as shown in FIG. 8, wherein duri represents the duration of the $i^{th}$ MPU. As shown in FIG. 8, in a media resource, the presentation time of the same MPU is different. Therefore, different associated versions of the same media resource require independent timelines to guide the presentation.

To ensure the user experience in the personalized service, the corresponding presentation timeline is provided for different media resources or different versions of the same media resource, so that the media content can present the contents selected by the user one by one according to the timeline. The present invention realizes the transmission of the presentation timeline by adding the new descriptor or adding other guidance information, such as message and table; three solutions as an example are introduced as follows.

Solution I:

The MPU timestamp descriptor defined in the MMT is used. The corresponding label of mpu_sequence_number and the corresponding UTC (Coordinated Universal Time) absolute presentation time of the MPU in a media resource are marked in the descriptor; the syntax structure of the descriptor is as shown in the table below.

| Syntax | No. of bits | Mnemonic |
|---|---|---|
| MPU_timestamp_descriptor ( ) { | | |
|     descriptor_tag | 16 | uimsbf |
|     descriptor_length | 8 | uimsbf |
|     for (i=0; i<N; i++) { | | |
|         mpu_sequence_number | 32 | uimsbf |
|         mpu_presentation_time | 64 | uimsbf |
|     } | | |
| } | | |

The descriptor_tag defines the tag of the descriptor type. The descriptor_length defines the length of the descriptor.

The mpu_sequence_number sequentially enumerates the labels of all MPUs contained in the corresponding media resources, and N represents the number of the MPUs.

The mpu_presentation_time enumerates the UTC absolute presentation time of all MPUs contained in the media resources corresponding to the descriptor.

In the process of transmitting the media content, the corresponding media data unit MPU is selected according to the media content selected by the user; the duration information (duration) is parsed. If the associated content of the media resource is selected, the MPU contained in each associated content version may be the same, namely the same MPU may have different absolute presentation time in different associated content versions; the service acquires the duration information of the corresponding MPU according to the version selected by the user. The UTC absolute presentation time corresponding to each MPU, namely mpu_presentation_time in the descriptor, is calculated by accumulating the duration of all MPUs before the specified MPU, in combination with the media playback time selected by the user or the media playback time specified by the system.

Some descriptive descriptors, such as the dependency descriptor and MPU_timestamp_descriptor, are defined in the signaling messages defined by the existing MMT protocol; therefore, a descriptor that provides the media content and the corresponding presentation time information can be defined. In an MPT (MMT Package Table), asset_descriptors fields exist, and the relevant descriptor can be added to the asset_descriptors as needed. In the using process of the multimedia services, the presentation can be achieved by adding the descriptor to the asset_descriptors.

However, on-demand services are user-driven; actions of the users during the viewing process need to be considered, such as pause and fast forward. In this case, if the server only provides the corresponding UTC absolute presentation time of each MPU, it will be unable to continue playing correctly; the server needs to rebuild the presentation timeline information for the further transmission, resulting in a larger computational burden and redundancy, as well as a certain delay, which affects the user experience. Because the playing time of the selected media content in the live broadcast service is fixed, it is a convenient way to use the UTC absolute presentation time, namely mpu_presentation_time, in the broadcast service. The user receives a media resource and selects the associated service, and meanwhile receives the corresponding MPU_timestamp_descriptor; the media data units of the contents of the associated parts are presented at a fixed time according to the time information in the descriptor.

Solution II:

The MPU timestamp descriptor is defined. An edit list is defined according to the associated content of the same media resource and the corresponding MPU set; each version of the associated content is endowed with a separate edit id. The mpu_sequence_number of all MPUs contained in each edit list and the corresponding presentation time information are described in the descriptor; the syntax structure of the descriptor is as shown in the table below.

| Syntax | No. of bits | Mnemonic |
|---|---|---|
| MPU_timestamp_descriptor ( ) { | | |
|     descriptor_tag | 16 | uimsbf |
|     descriptor_length | 8 | uimsbf |
|     edit_list_number | N1 | |
|     for (i=0; i<N1; i++){ | | |
|         edit_id | | |
|         for (j=0; j<N; j++){ | | |
|             mpu_sequence_number | 32 | uimsbf |
|             mpu_presentation_time | 64 | uimsbf |
|         } | | |
|     } | | |
| } | | |

The descriptor_tag defines the tag of the descriptor type.

The descriptor_length defines the length of the descriptor.

The edit_list_number defines the associated content of the media resource, and N1 represents the number.

The edit_id defines the label of each version of the associated content of the media resource.

The mpu_sequence_number_sequentially enumerates the labels of all MPUs contained in the corresponding media resources, and N represents the number of the MPUs.

The mpu_presentation_time enumerates the UTC absolute presentation time of all MPUs contained in the media resources corresponding to the descriptor.

In the process of transmitting the media content, the UTC absolute presentation time, mpu_presentation_time, of all associated contents of the selected media resource is written in the descriptor according to the media content selected by the user (the time acquisition mode refers to the Solution I). In the process of consuming the media content, the server sends the descriptor to the client with the signaling information. The user selects a version of the associated content, and parses the media data unit MPU and the corresponding absolute presentation time mpu_presentation_time according to the corresponding edit_id, thereby generating the timeline of the corresponding version to control the presentation. Through the above method, the presentation time of each associated version of the media content can be easily obtained, and the personalized user requirements are guided by the same descriptor information, which is more convenient to control.

Solution III:

The duration of each MPU in a media resource is described in the signaling; the starting time of the media resource is obtained from the CI; the UTC absolute presentation time of each MPU is calculated.

| Syntax | No. of bits | Mnemonic |
|---|---|---|
| MPU_presentation_descriptor ( ) { | | |
|     descriptor_tag | 16 | uimsbf |
|     descriptor_length | 8 | uimsbf |
|     for (i=0; i<N; i++) { | | |
|         mpu_sequence_number | 32 | uimsbf |
|         mpu_duration | 64 | uimsbf |
|     } | | |
| } | | |

The descriptor_tag defines the tag of the descriptor type.

The descriptor_length defines the length of the descriptor.

The mpu_sequence_number sequentially enumerates the labels of all MPUs contained in the corresponding media resources, and N represents the number of the MPUs.

The mpu_duration enumerates the UTC absolute presentation time of all MPUs contained in the media resources corresponding to the descriptor.

In the process of transmitting the media content, the corresponding media data unit MPU is selected according to the media content selected by the user; the duration information (duration) is parsed, and the guidance presenting information, namely the label mpu_sequence_number of the MPU and the corresponding duration information, is generated.

In view of a variety of different transmission network conditions, the solution III can get the corresponding duration information when the media data units are generated and encapsulated, so as to better meet the real-time requirement and the application requirements for the real-time live broadcast. The absolute presentation time is replaced by transmitting the duration information, so that the client can organize the media content more flexibly. At the same time, in the broadband on-demand service, the users can be supported to perform input operations at any time, which satisfies the personalized demands of the users.

The above three solutions can cover a number of multimedia transmission systems including the broadband network, the broadcast network and even the heterogeneous network; moreover, the personalized presentation services can be realized by adding the corresponding presentation timeline to the presentation guidance file CI or other positions for transmitting the signaling information.

In the process of controlling the presentation, the broadcast and real-time live broadcast services are presented at the current access time of the user. To save the bandwidth resource and the storage resource and computational consumption of the client, only the presentation time information or duration information (hereinafter collectively referred to as the relevant time information) of unconsumed MPUs is written in the above-mentioned descriptor; the relevant time for all MPUs corresponding to the media resource is not transmitted. Through the above method, although the complexity of generating the signaling information is increased, the transmission network bandwidth and the limited computing power of the client are greatly saved. In addition, as the on-demand service does not have the random access problem, the relevant time information of the limited number of the MPUs can be transmitted correspondingly when the user starts to use the service; the relevant time information of the subsequent MPU is transmitted according to the viewing progress of the users. To ensure the viewing fluency, it is necessary to respond promptly to the operation of the users during viewing, transmit the relevant time information, and update the presentation timeline.

In order to more clearly describe the implementation method of the present invention, as shown in FIG. 4, MPU_presentation_descriptor is generated according to the description method of the Solution III, so as to construct a personalized presentation timeline mechanism in the VoD service; a specific implementation process is described by way of example.

As shown in FIG. 4, the above-mentioned Solution III is described as an example; a timeline control method for the personalized presentation of the multimedia content is provided. The specific process of the method is described as follows.

When the receiver requests the VoD service, the transmitter sends the signaling information; the receiver receives the MUR, CI and HTML files by judging the PI_content_type_length_byte field in the MPI table, and meanwhile updates and generates an MPU storage database MySQL maintained locally; when the user requests the compact version of the video, the receiver obtains the identifier edit_id=00 of edit_list corresponding to the compact version of the video, wherein the mpu_seq_number of the contained media unit is 1,9; at the moment, the receiver requests the media content of edit_id=00. The transmitter parses the request and obtains the corresponding mpu_seq_number, parses the media data unit MPU and obtains the corresponding duration information, and generates the MPU_presentation_descriptor signaling. The receiver receives the corresponding signaling, generates the absolute presentation time of each MPU based on the MPU_presentation_descriptor and the starting time in the CI, and maintains the presentation timeline. At the same time, the receiver receives the media data, stores the media data locally and plays to the user, and updates the local database. When the user continues requesting the clipped version of the video, the edit_id thereof is edit_id=00U01. By checking the edit_list signaling of the associated media content and the MPU existing in the local database, the media resource of edit_id=01 is requested from the transmitter. After receiving the signaling and media data, the receiver parses and obtains the media data unit mpu_seq_number in the resource, recalculates the presentation time of the MPU contained in the clipped version of the video according to the duration information in the MPU_presentation_descriptor signaling, and updates the presentation timeline. At the same time, the receiver receives the MPUs with mpu_seq_number of 4,6, and stores the MPUs locally.

The fifth preferred embodiment satisfies the personalized demands of the users, and ensures the smooth viewing experience of the users by using the relevance of the same set of programs on the basis of saving the storage space. As the presentation to timeline signaling of the media is transmitted flexibly with the signaling information, in view of the low user experience caused by the delay and packet loss in the process of consuming the media resources, if the packet loss event is detected before the presentation time, it is optional to wait the re-acquisition of the media resources or repeatedly present the content of the previous media data unit for preventing the playback from lagging, so as to ensure the user experience.

Some of the above-mentioned preferred embodiments of the present invention illustrate the proposed solutions by taking the MMT as an example; but the solutions can also be used for other file encapsulation, transmission systems and protocols.

Preferred embodiments of the present invention are described above. It shall be understood that the present invention is not limited to the above-mentioned preferred embodiments, and those skilled in the art can make different variants and modifications within the scope of the claims, which will not affect the substance of the present invention.

What is claimed is:

1. An implementation method of multimedia content classification technology, comprising steps of: cutting a multimedia file into multiple Media Processing Unit (MPU) segments, wherein each MPU segment has a different mark field therein; classifying all of the MPU segments into different levels according to an importance of multimedia content, so that a user is able to selectively play the multimedia content according to the levels, instead of selecting blindly and randomly, and the MPU segments of same level form one version of content; and defining a new Media Unit Relationship (MUR) information file for describing corresponding relationships between the multimedia file and different versions of content, mpu_seq_number and level list, wherein: each mpu_seq_number is the mark field in each MPU segment; each level list represents a set of mpu_seq_number;

correspondence rules between a level_list array and the different versions of the content are different and are able to be divided into two types, wherein: in Type 1, a one-to-one correspondence exists between each version of the content and the corresponding level list in the level list array; and in Type 2, the different versions of the content are combinations of the different level_list; and a differential transmission of the multimedia file is preformed according to content of the MUR information file in the Type 1 and the Type 2.

2. The implementation method of the multimedia content classification technology, as recited in claim 1, wherein in the Type 1, each level_list is composed of different MPU segments, and has a one-to-one correspondence with corresponding version of the content; when the user needs more segments, a server only needs to transmit missing MPU segments to the user; and in the Type 2, each level list is composed of different MPU segments, and no overlapping MPU segment exists between each level_list; the different versions of content are composed of different level_list; when the users want to view a full version after viewing a clipped version, only MPU segments contained in the specific level list are required to be transmitted differentially.

3. The implementation method of the multimedia content classification technology, as recited in claim 2, wherein MUR information is added to signaling information through adding the MUR information to an existing Composition Information (CI) the, through adding an MUR the that describes the MUR information to the signaling information, through adding a descriptor that describes the MUR information, wherein the descriptor is descriptive information for defining some fields or functions in a signaling part of an MPEG Media Transport (MMT) protocol, or through adding a signaling table that describes the MUR information.

* * * * *